US011177953B2

(12) United States Patent
Zeh et al.

(10) Patent No.: US 11,177,953 B2
(45) Date of Patent: Nov. 16, 2021

(54) TRUSTED AUTHENTICATION OF AUTOMOTIVE MICROCONTROLLER

(71) Applicant: Infineon Technologies AG, Neubiberg (DE)

(72) Inventors: Alexander Zeh, Munich (DE); Martin Brunner, Munich (DE); Marcus Janke, Munich (DE)

(73) Assignee: Infineon Technologies AG

(*) Notice: Subject to any disclaimer, the term of this patent is extended or adjusted under 35 U.S.C. 154(b) by 259 days.

(21) Appl. No.: 16/561,311

(22) Filed: Sep. 5, 2019

(65) Prior Publication Data

US 2021/0075606 A1    Mar. 11, 2021

(51) Int. Cl.
  *H04L 29/06*   (2006.01)
  *H04L 9/08*    (2006.01)
  *H04L 9/32*    (2006.01)
  *G06F 21/57*   (2013.01)

(52) U.S. Cl.
  CPC ............ *H04L 9/0894* (2013.01); *G06F 21/57* (2013.01); *H04L 9/0825* (2013.01); *H04L 9/0897* (2013.01); *H04L 9/3263* (2013.01); *H04L 63/0823* (2013.01); *H04L 63/126* (2013.01)

(58) Field of Classification Search
  CPC ... H04L 9/0894; H04L 9/3263; H04L 63/126; H04L 63/0823; H04L 9/0825; H04L 9/0897; H04L 9/3247; H04L 9/3271; G06F 21/57; G06F 21/602
  See application file for complete search history.

(56) References Cited

U.S. PATENT DOCUMENTS

| | | | | |
|---|---|---|---|---|
| 8,478,973 B2* | 7/2013 | Gueller | ................... | G06F 21/51 |
| | | | | 713/1 |
| 11,048,791 B2* | 6/2021 | Simpson | ............... | H04L 9/3247 |
| 2005/0113068 A1* | 5/2005 | Hoffmann | ............. | H04L 9/3263 |
| | | | | 455/411 |
| 2006/0289658 A1* | 12/2006 | Fischer | ................... | G06F 21/79 |
| | | | | 235/492 |
| 2009/0116650 A1* | 5/2009 | Cizas | .................... | H04L 9/0866 |
| | | | | 380/278 |
| 2011/0093714 A1* | 4/2011 | Schaecher | ............. | H04L 9/3271 |
| | | | | 713/176 |
| 2011/0154043 A1* | 6/2011 | Lim | ........................ | G06F 21/73 |
| | | | | 713/172 |
| 2014/0006785 A1* | 1/2014 | Shaliv | ..................... | H04L 9/088 |
| | | | | 713/170 |

(Continued)

*Primary Examiner* — Sher A Khan
(74) *Attorney, Agent, or Firm* — Design IP (57) ABSTRACT

An authentication system includes a microcontroller having a unique identifier (ID) and a first key pair including a microcontroller secret key and a microcontroller public key. The microcontroller is configured to store the unique ID, the first key pair, a digital signature of the unique ID, the digital signature being generated using an external secret key of a second key pair, and a digital certificate of the microcontroller public key that is signed by the external secret key of the second key pair. The second key pair includes the external secret key and an external public key. The authentication system further includes a controller configured to perform a first authenticity validation check on the unique ID using the external public key and perform a second authenticity validation check on the microcontroller public key using the external public key.

38 Claims, 5 Drawing Sheets

(56) References Cited

U.S. PATENT DOCUMENTS

2014/0068736 A1* 3/2014 Agerstam ............ H04W 12/50
    726/7
2015/0372998 A1* 12/2015 Elien ...................... G06F 21/33
    713/168
2018/0219857 A1* 8/2018 Bhattacharya ...... H04L 63/0807

* cited by examiner

TRUSTED AUTHENTICATION OF AUTOMOTIVE MICROCONTROLLER

FIELD

The present disclosure relates generally to authenticating one or more aspects of a microcontroller.

BACKGROUND

Functional safety of electronic systems in automotive vehicles is an important topic in the light of increasing automation and semiconductor content of modern vehicles. It is desirable to have a reliable and safe functionality for the safety critical parts deployed in the system.

In addition to functional safety, cybersecurity has become an important aspect in vehicle electronics systems. It is inevitable to include both functional safety and automotive cybersecurity from the beginning of an electronic product design. Functional safety has reached a level of maturity, but cybersecurity is relatively new. Security parts may soon be required to be both safe and secure.

Cryptography enables confidentiality, authenticity, and data integrity and will become more prominent in the automotive semiconductor sector, where functional safety, real time constraints, and energy consumption play an important role.

Cryptographic key distribution and management play an important role for the security setup for in vehicle components, networks and secured backend communication. Establishing trust along the different entities becomes a fundamental prerequisite for securing vehicle functions. An entity may be a communication endpoint inside an Electronic Control Unit (ECU) or a microcontroller unit (MCU) within an ECU or may be a communication endpoint outside the vehicle at, for example, an Internet server or a mobile consumer device. Entities are developed by multiple different suppliers and vendors.

The injection of an initial cryptographic key into the vehicle, which forms the root of trust, is thereby a crucial step given that the security concept relies on the trustworthiness (i.e., confidentiality, authenticity and integrity) of this initial key. That is, further keys are derived from this initial key, which are subsequently used for securing vehicle functions and establishing trust relationships along MCUs. Additionally, injection of keys in the process of vehicle manufacturing may lead to high efforts if, for example, the components are already built in complex systems. On the other hand, the injection of keys in single chips during their production time can be much easier for prepared companies.

Therefore, an improved system capable deploying key material for cryptographic functions may be desirable.

SUMMARY

One or more embodiments are directed to an authentication system includes a microcontroller having a unique identifier (ID) and a first key pair including a microcontroller secret key and a microcontroller public key. The microcontroller is configured to store the unique ID, the first key pair, a digital signature of the unique ID, the digital signature being generated using an external secret key of a second key pair, and a digital certificate of the microcontroller public key that is signed by the external secret key of the second key pair. The second key pair includes the external secret key and an external public key. The authentication system further includes a controller configured to perform a first authenticity validation check on the unique ID using the external public key and perform a second authenticity validation check on the microcontroller public key using the external public key.

One or more embodiments are directed to a method of authenticating an aspect of a microcontroller that has a unique identifier (ID) and a first key pair including a microcontroller secret key and a microcontroller public key, where the microcontroller stores the unique ID, the first key pair, a digital signature of the unique ID, the digital signature being generated using an external secret key of a second key pair, and a digital certificate of the microcontroller public key that is signed by the external secret key of the second key pair, and where the second key pair includes the external secret key and an external public key. The method includes performing, by a controller, a first authenticity validation check on the unique ID using the external public key; and performing, by the controller, a second authenticity validation check on the microcontroller public key using the external public key.

BRIEF DESCRIPTION OF THE DRAWINGS

Embodiments are described herein referring to the appended drawings.

DETAILED DESCRIPTION

In the following, a plurality of details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise. For example, variations or modifications described with respect to one of the embodiments may also be applicable to other embodiments unless noted to the contrary. Optional elements or elements that are capable of being activated and deactivated may be illustrated via the use of dashed lines and blocks in the figures.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based or optical (i.e. optical fiber link) connections or wireless connections unless noted otherwise. Furthermore, such connections or couplings may be direct or indirect, as long as the general purpose of the connection or coupling is essentially maintained. For example, the general purpose may be to transmit a certain kind of signal or to transmit a certain kind of information.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

It will be appreciated that the terms "microprocessors", "processors", "processor cores", "processing units", and "processing circuitry" may be used interchangeably throughout this disclosure. A processor may include dedicated hardware for processing, storing, and/or distributing data and information. Two or more processors may also be combined to perform a processing function and may be regarded as a processor.

Embodiments relate to Trusted Platform Modules (TPMs) that provide, in addition to automotive microcontrollers, tamper-resistant and security certified cryptographic key generation and storage capabilities along with a software stack. A TPM is a secure cryptoprocessor, which is a dedicated microcontroller designed to secure hardware through integrated cryptographic keys, and thus enables additional secured functionalities. Specifically, a TPM is a tamper resistant chip with a fixed function set defined by a trusted computing group (TCG) and may be referred to as a discrete, tamper resistant security controller. The TPM may serve as a central trust anchor for a vehicle and thus host authenticity information about the automotive microcontroller.

A secure element as used herein refers to a secure (i.e., tamper-resistant) storage device. Both a TPM and a secure element are tamper-resistant hardware devices.

A logic block may include one or more processors and/or other logic circuitry configured to receive and process one or more inputs to generate an output. In particular, a logic block may be any computational device such as a processor, a central processing unit (CPU), a TPM, a cryptographic engine, a computing system, or the like.

Embodiments relate to Electronic Control Units (ECUs) and vehicle communication networks (e.g., Controller Area Networks (CAN), CAN with Flexible Data-Rate (CAN-FD), CANXL, Ethernet (ETH), Peripheral Component Interconnect Express (PCIe), or another bus standard). An ECU is any embedded system in automotive electronics that controls one or more of the electrical systems or subsystems in a vehicle. Thus, an ECU may be referred to as a controller. Furthermore, a controller does not necessarily have to be an ECU, but may be any device that performs an authenticity validation check and performs a control function based thereon.

Each ECU includes at least a microcontroller (i.e., a microcontroller unit (MCU)), a memory, various inputs (e.g., supply voltage, digital inputs, and/or analog inputs) and outputs (e.g., relay drivers, H bridge drivers, injector drivers, and/or logic outputs), and communication links. Thus, the ECUs are the nodes of in-vehicle automotive networks, while the edges of those networks are communication networks (e.g., CAN, CAN FD, ETH, PCIe, etc.).

A non-exhaustive list of ECU types includes an Engine Control Module (ECM), an Engine Control Unit, a Transmission Control Unit, a Transmission Control Module (TCM), a Brake Control Module (BCM or EBCM), a Central Control Module (CCM), a Central Timing Module (CTM), a General Electronic Module (GEM), a Body Control Module (BCM), a Suspension Control Module (SCM), a Door Control Unit (DCU), an Electric Power Steering Control Unit (PSCU), a Human-Machine Interface (HMI), a Seat Control Unit, a Speed Control Unit (SCU), a Telematic Control Unit, a central Gateway (GW), a Domain Controller (DC), an Infotainment Head Unit (IHU), a Multimedia Head Unit (MMU) and a Battery Management System (BMS). Sometimes the functions of the Engine Control Unit and the Transmission Control Unit are combined into a single ECU called a Powertrain Control Module (PCM). In addition, the BCM may be configured to control an anti-lock braking system (ABS), electronic stability control (ESC), and/or dynamic stability control (DSC).

Embodiments relate to asymmetric cryptography, also known as public key cryptography, which uses public and private keys to encrypt and decrypt data as well as for signing and/or verification of data. The keys are selected large numbers that have been paired together but are not identical (asymmetric). One key in the pair can be shared with everyone; it is called the public key. The other key in the pair is kept secret; it is called the private key. The private key cannot be derived from the public key. Either of the keys can be used to encrypt a message; the opposite key from the one used to encrypt the message is used for decryption. For example, a message may be encrypted using the receiver's public key, but that encrypted message can only be decrypted with the receiver's private key.

A cryptographic hash function or hashing algorithm is any function or mathematical algorithm that can be used to map data of arbitrary size to data of a fixed size (i.e., to generate a hash). The hash is a fixed-length string of numbers and/or letters generated from the mathematical algorithm and the arbitrarily sized message, such as an email, document, picture, software, or other type of data. The values returned by the hash function are called hash values, hash codes, digests, or simply hashes. A hash function is deterministic so that the same input always results in the same hash output. This means the generated string is representing the file being hashed and is a one-way function making it mathematically difficult to find two different inputs with the same hash value. Hashing algorithms commonly used include SHA-1, SHA-2 and SHA-3, but embodiments described herein are not limited thereto.

For example, a message may be secured against unauthorized modifications prior to transmission. When a secured message is to be transmitted, a hash of the intended message is generated and signed with a transmitter's private key, and is sent along with the message. When the message and the signed hash are received, the receiver decrypts the hash. Then, the receiver creates another hash from the message. If the two hashes are identical when verified, it can be stated that the message has not been modified and thus a secured transmission has occurred. Both the transmitter and the receiver must use the same hash function or algorithm. In some cases, the transmitter may send the receiver the algorithm or an algorithm identifier along with the hash value of the message. This hashing process hinders alteration of the message by an unauthorized end user. Thus, the purpose of hashing is to verify the integrity of the transmitted message, but it may also be used for authentication if a key is used.

A digital signature refers to a set of algorithms and encryption protections used to validate the authenticity of a message, software, or digital document. Digital signatures work by proving that a digital message, software, or document was not modified—intentionally or unintentionally—from the time it was signed. Digital signatures do this by generating a corresponding/related unique hash of the message or document and signing it using the sender's private key. The hash generated is unique corresponding to the message, software, or document, and changing any part of it will completely change the hash.

Once completed, the message or digital document is digitally signed and sent to the recipient. The recipient then generates his/her own hash of the message or digital document. The recipient compares the generated hash against the sender's decrypted hash; if they match, the message or digital document is verified and the sender is authenticated.

Digital signatures can be based on asymmetric cryptography and can provide assurances of evidence to origin, identity and status of an electronic document, transaction or message, as well as acknowledging informed consent by the signer. Here, a message is signed with the sender's private key and can be verified by anyone who has access to the sender's public key.

Specifically, to create a digital signature, signing software creates a so-called cryptographic hash value of the electronic data to be signed. This value is calculated utilizing a certain cryptographic hash function, i.e., a mathematical algorithm which transforms input data of arbitrary length into a bit string of a fixed size. This resulting cryptographic hash value is also referred to as "message digest". Mathematically, it is a one-way function. That is, a function, which is practically infeasible to invert. The user's private key is then used to sign the hash, returning a value that is—with a certain reliability—unique to the hashed data. The signed hash, optionally along with other information such as the hashing algorithm, forms the digital signature.

It will be appreciated that a hash function can provide identical hash values for two different strings, which is termed hash collision, this shall be referred to when speaking of the uniqueness with a certain reliability. When introducing cryptographic hash functions, a "good" (proven) hash function should be practically collision free and the presumption is, that such a hash function is used in the described embodiments.

This reliability of uniqueness for hash values enables others to validate the integrity of the data as originating from the signer using the signer's public key to verify the signed hash, as will be explained in the following: Say an originator wants to indicate some data as being original data the originator provided. To this end, the originator may calculate a hash value over the data and sign the hash value. So ignoring potential hash collisions, a third party may use the signed hash to verify the data by recalculating a hash over the data and by verifying the signature using the public key of the originator.

If the decrypted hash matches a second computed hash of the same data created by the same hashing algorithm, it indicates that the data has not changed since it was signed. Again, ignoring hash collisions, if the two hashes do not match, the data has either been tampered with in some way (indicating a failure of integrity) or the signature was created with a private key that does not correspond to the public key presented by the signer (indicating a failure of authentication).

This signature verifying algorithm ($VER_S$) indicates that the sender had access to the private key, and therefore is likely to be the person associated with the public key. This also indicates that the message has not been tampered with, as a signature is mathematically bound to the message it originally was made with, and verification will fail for practically any other message, even if similar to the original message.

An encrypted plaintext message may be referred to a ciphertext. Ciphertext is the result of encryption performed on plaintext using an algorithm, called a cipher. Ciphertext is also known as encrypted or encoded information because it contains a form of the original plaintext that is non-interpretable (i.e., it appears as a set of random characters) by a human or computer without the proper cipher to decrypt it.

Decryption, the inverse of encryption, is the process of turning ciphertext into interpretable plaintext. As noted above, a message may be transmitted encrypted (e.g., as ciphertext) or unencrypted, along with its hash value.

Embodiments may relate to a challenge-response authentication, which is a family of protocols in which one party presents a question (i.e., a "challenge") and another party must provide a valid answer (i.e., a "response") to be authenticated.

The general notation H=HASH(D) represents a hash value H obtained by hashing data D via hash function/algorithm HASH.

The general notation {SK, PK} represents a key pair consisting of a secret key SK and a public key PK. The key pair may be a key pair of a Certificate Authority (CA) that uses the secret key SK to sign a digital certificate.

The general notation $C=ENC_{PK}(P)$ represents ciphertext C obtained by encryption of plaintext P with an encryption algorithm ENC using a public key PK of key pair {SK, PK}.

The general notation $P=DEC_{SK}(C)$ represents plaintext P obtained by decryption of ciphertext C with a decryption algorithm DEC using a secret key SK of key pair {SK, PK}.

The general notation $S=SIGN_{SK}(D)$ represents a signature S of data D generated with a signing algorithm SIGN using secret key SK of key pair {SK, PK}.

The general notation $VER_S$(PK, S, D) represents a signature verifying algorithm ($VER_S$) performed using public key PK, signature S generated using SK of key pair {SK, PK}, and data D. The signature verifying algorithm ($VER_S$) either accepts or rejects the authenticity of the signature/message.

The general notation $C_A=Cert_{SK}${PK-A} represents a certificate $C_A$ of public key PK-A signed by secret key SK of key pair {SK, PK}.

The general notation $VER_C$(PK, $C_A$, PK-A) represents a certificate verifying algorithm ($VER_C$) performed using public key PK of key pair {SK, PK}, certificate $C_A$ of public key PK-A, and public key PK-A. The certificate verifying algorithm ($VER_C$) either accepts or rejects the authenticity of the public key PK-A.

The general notation $R=SIGN_{SK-A}(CV)$ represents a response R to a unique challenge value CV, where a device-specific secret key SK-A is used to sign the unique challenge value CV with the signing algorithm SIGN. Thus, the response R is a signature of challenge data CV generated using secret key SK of a device key pair {SK-A, PK-A}. The challenge value CV may be a randomly generated information, such as a random integer or random string of bits generated by a random number generator.

The general notation $VER_R$(PK-A, R, CV) represents a challenge-response authentication verifying algorithm ($VER_R$) performed using a device-specific public key PK-A, signature R generated using SK-A, and challenge value CV. The signature verifying algorithm ($VER_R$) either accepts or rejects the authenticity of the challenge value CV.

The general notation ID represents a hardware identifier of a device.

Embodiments further relate to methods for deploying key material (e.g., secret and/or public keys) for cryptographic functions for ECUs that are the nodes of in vehicle automotive networks, while the edges are communication networks. Such communication networks include, for example, CAN, CAN-FD, and Ethernet. In particular, embodiments relate to establishing a secured channel between a microcontroller and a secure element.

Due to the "use-only" nature of cryptographic secret keys, which are stored in a secure element, the keys cannot be read out but can also not be viewed or inspected. However, it is possible that one or more keys may become compromised, leaked, or amended (e.g., via software) either intentionally or unintentionally without a way to authenticate the keys. Thus, embodiments further relate to authenticating an automotive microcontroller by determining that the microcontroller is a genuine (e.g., an untampered, non-counterfeit) device. This is achieved by verifying that its corresponding device-specific key (pair), which corresponds to a certain hardware identifier and has been injected during production, is being utilized (i.e., that the correct key pair is being used).

A key is said to correspond to a hardware identifier (e.g., a chip-unique ID or serial number) when the hardware identifier is integrated in the calculation of the key thereby "binding" a given key to a certain hardware device, such as a microcontroller. In addition, when verifying a key, the underlying assumption is, if the key is a genuine one, the microcontroller must also be the genuine one.

Figure 1:
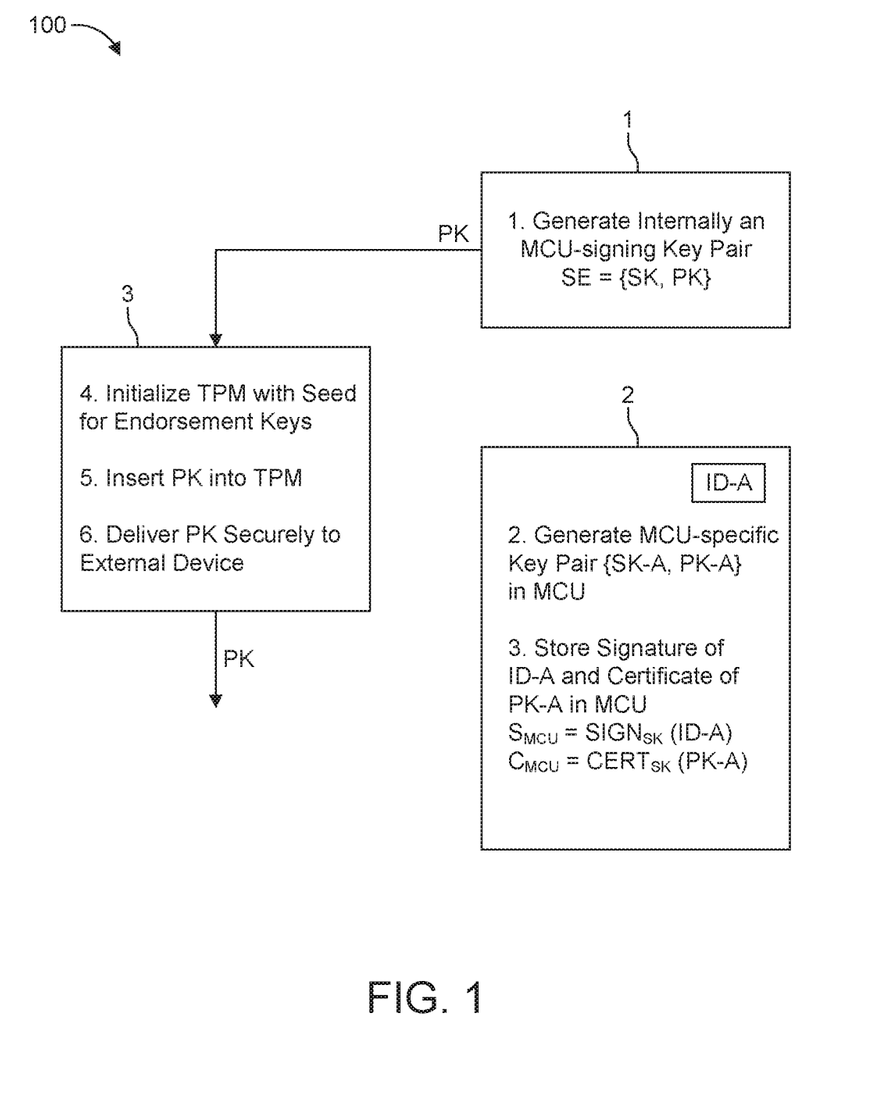
FIG. 1 is a block diagram of a trusted authentication system 100 for an automotive microcontroller according to one or more embodiments.

FIG. 1 is a block diagram of a trusted authentication system 100 for an automotive microcontroller according to one or more embodiments. The trusted authentication system 100 includes an external secure element 1, an automotive microcontroller (MCU) 2 having a hardware identifier ID-A, and a TPM 3.

The external secure element 1 may further be referred to as a hardware security module (HSM). In addition, the TPM 3, being a tamper-resistant hardware device, is not limited to a TPM. For example, the tamper-resistant hardware device 3 may be a secure server, and more particularly, a secure online server. A secure server is a highly protected server, which level of security may be at least the same or considerably higher than that of a TPM. Thus, an online service that has oversight of the secure online server may provide the functionalities of the TPM/tamper-resistant hardware device 3 described herein via a secure server. Alternatively, the tamper-resistant hardware device 3 may be another ECU (e.g., a central gateway).

In a first step, the external secure element 1 generates internally an automotive microcontroller signing key pair {SK, PK}, where the secret key SK is stored and highly protected (e.g., up to Evaluation Assurance Level 6+ (EAL6+)).

In a second step, the microcontroller 2 generates its key pair {SK-A, PK-A}, where SK-A is a "use-only" secret key.

In a third step, a signature $S_{MCU}$ of the microcontroller's identifier ID-A (i.e., $S_{MCU}$=$SIGN_{SK}$(ID-A)) and a certificate $C_{MCU}$ of the microcontroller's public key PK-A (i.e., $C_{MCU}$=$CERT_{SK}$(PK-A)) are provided by the secure element 1 and stored in the microcontroller 2. Here, there a Public Key Infrastructure (PKI) may be involved or the secure element 1 in the fab acts also as a CA and creates the certificate via self-signing. That is, the secure element 1 adds the corresponding information to the public key PK-A which makes it a certificate (i.e., subject->HW identifier, public key, hash/fingerprint, validity, etc.) and signs it, whereas in this case the signature of the SE=signature of the CA.

It is noted that the secret key SK of the secure element 1 never leaves the secure element 1 and the secret key SK-A of the microcontroller 2 never leaves the microcontroller 2. However, the secure element 1 sends its public key PK to the TPM 3. Furthermore, another MCU may be used instead of a secure element 1. In that case, the secret key SK for signing may be securely stored in the other MCU.

On the TPM side, in a fourth step, the TPM is initialized with a seed for endorsement of keys. In fifth step, the public key PK of the secure element 1 is inserted into the TPM 3. Finally, in a sixth step, the TPM 3 delivers the public key PK of the secure element 1 in a secured way on demand to a requesting entity. That is, the TPM 3 transmits information, such as the public key PK, only upon receiving a request that triggers the transmission. In this way, the TPM 3 provides authentic PKs.

It is also noted that the secure element 1 can implement a counter that counts how often $S_{MCU}$ or $C_{MCU}$ are generated and may also restrict their generation to a certain number.

Figure 2:
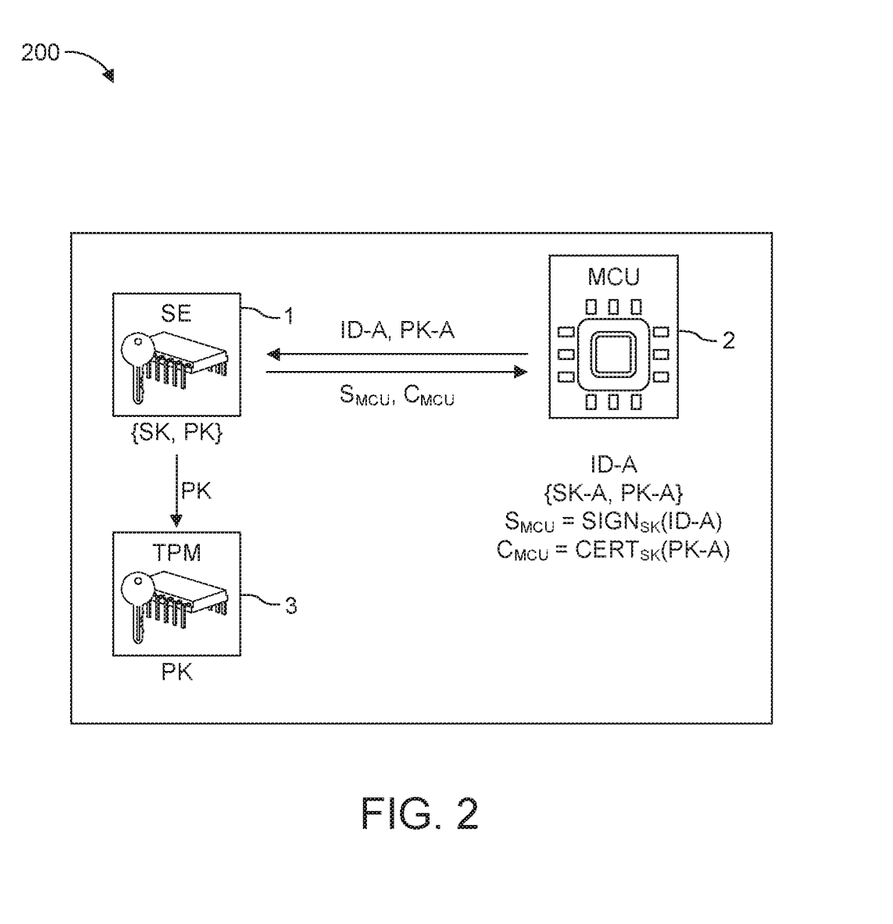
FIG. 2 is a block diagram of a trusted authentication system 200 for an automotive microcontroller according to one or more embodiments.

FIG. 2 is a block diagram of a trusted authentication system 200 for an automotive microcontroller according to one or more embodiments. Similar to system 100 illustrated in FIG. 1, the trusted authentication system 200 includes the external secure element 1, the automotive microcontroller (MCU) 2 having the hardware identifier ID-A, and the TPM 3.

In particular, the secure element 1 stores a key pair {SK, PK} and sends its public key PK to the TPM 3 for secured storage. In addition, the MCU 2 stores its identifier ID-A and generates and stores its own device-specific key pair {SK-A, PK-A}. The MCU 2 sends its identifier ID-A and its public key PK-A to the secure element 1. In turn, the secure element 1 generates a signature $S_{MCU}$ of the microcontroller's identifier ID-A (i.e., $S_{MCU}$=$SIGN_{SK}$(ID-A)) using its secret key SK. The secure element also obtains a certificate $C_{MCU}$ of the microcontroller's public key PK-A (i.e., $C_{MCU}$=$CERT_{SK}$(PK-A)) either from a CA or from self-signing while acting like a CA. The secure element 1 then sends the signature $S_{MCU}$ and the certificate $C_{MCU}$ to the MCU 2 where they are stored.

Figure 3:
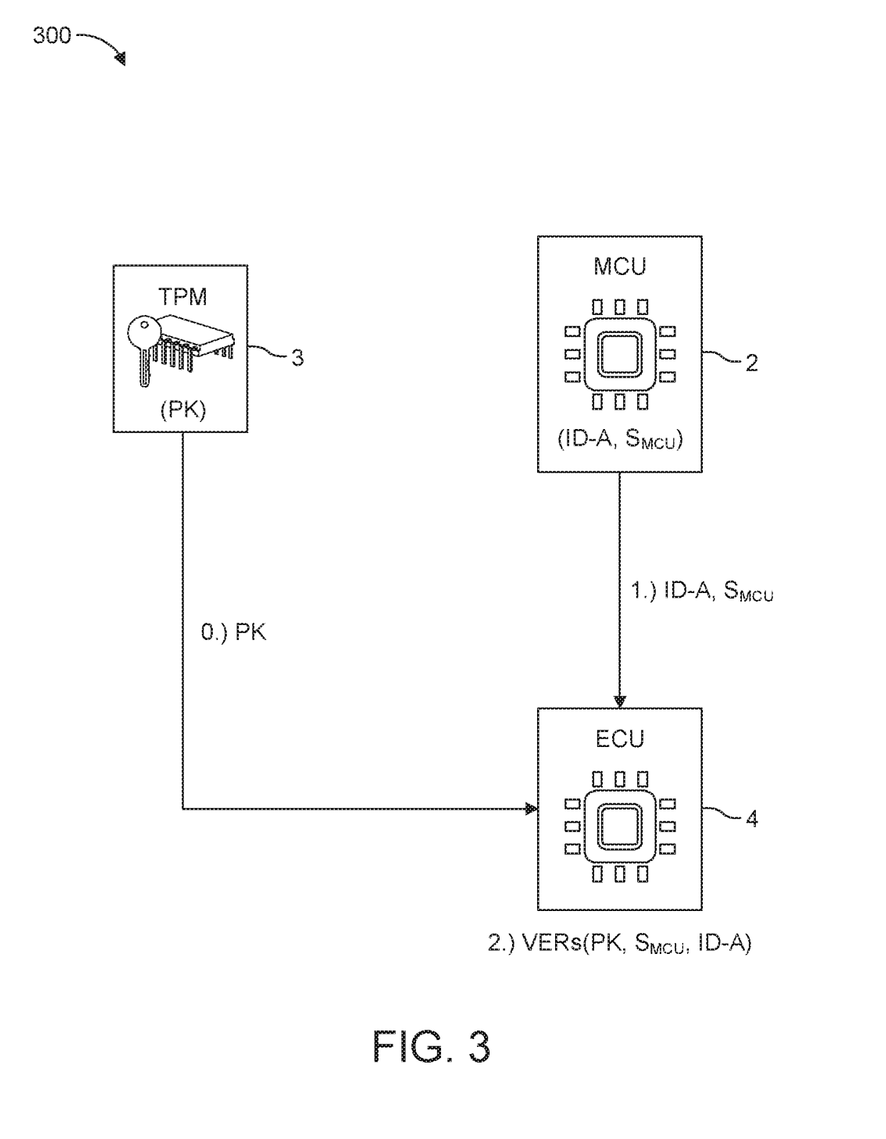
FIG. 3 is a block diagram of a trusted authentication system 300 for an automotive microcontroller according to one or more embodiments.

FIG. 3 is a block diagram of a trusted authentication system 300 for an automotive microcontroller according to one or more embodiments. The trusted authentication system 300 includes an automotive microcontroller (MCU) 2 having the hardware identifier ID-A, a TPM 3, and an ECU 4 (i.e., a controller). The MCU 2 and the TPM 3 have already performed the exchange illustrated in FIG. 2. Thus, the TPM 3 stores the public key PK and the MCU 2 stores its ID-A, a device-specific key pair {SK-A, PK-A}, signature $S_{MCU}$, and certificate $C_{MCU}$. The TPM 3 is considered to be "bound" to the MCU 2 utilizing functions provided by the TPM feature set, such as "sealing". The TPM 3 may be bound to many ECUs by providing the same PK.

The ECU 4 is configured to authenticate the MCU 2 by authenticating its identifier ID-A. In particular, in step zero, the ECU 4 receives the public key PK from a trusted entity, such as the TPM 3. Specifically, the TPM 3 sends public key PK upon receiving a request from the ECU 4. The TPM 3 itself does not send anything without a prior request. That is, it only serves keys as a response to a corresponding request.

In step 1, the ECU 4 receives the signature $S_{MCU}$ and the identifier ID-A, the ID-A being representative of the transmitted data and is unique to the MCU 2.

Lastly, in step 2, the ECU 4 performs a signature verifying algorithm $VER_S(PK, S_{MCU}, ID\text{-}A)$ using the public key PK received from the TPM 3, signature $S_{MCU}$, and the identifier ID-A, and determines whether to accept or reject the authenticity of the signature/message, and ultimately the authenticity of the identifier ID-A.

As a result, the ECU 4 is configured to use the signature $S_{MCU}$ to verify the authenticity of the MCU 2 by verifying the authenticity of its identifier ID-A. To do so, the ECU 4 uses the public key PK, where the required public key PK for the signature verifying algorithm is provided by a trusted entity, TPM 3 (i.e., an entity trusted by the ECU 4). The TPM 3 is a trusted entity of which the ECU 4 has an established root of trust with the TPM 3. The public key PK is the counterpart to the secret key SK that was used to generate the signature $S_{MCU}$. In contrast, the ECU 4 is not considered to have a root of trust with MCU 2 or has a lower root of trust with the MCU 2 than the root of trust with TPM 3.

An unsuccessful verification operation indicates a failure of authentication of the MCU 2. In the case of an authentication failure, the ECU 4 may signal an authentication error to the system and/or to a user. Moreover, authentication failures may be logged and the logs securely stored in or protected by the TPM, respectively. That way, this information can be remotely queried leveraging the TPM as a trusted endpoint in the vehicle that is unlikely to be tampered by an adversary. In this way, attempts to compromise the system may be detected, even under the assumption that an adversary gained full control over the ECU.

It is also noted that the public key PK may be stored on the MCU 2 at production time and then transferred to the TPM 3 and used when the vehicle is running.

This technique may be used to block one or more attack paths, including an attacker that copies ID-A from the original MCU 2 and fakes it, an attacker manipulating the transfer of the ID-A from the MCU 2 to the ECU 4, or an attacker that physically manipulates the storage of the ID-A.

The ECU 4 may be configured to perform the authentication verification check at each vehicle start-up, on demand by a user, or periodically at a predetermined time interval or after a predetermined number of vehicle start-ups.

Figure 4:
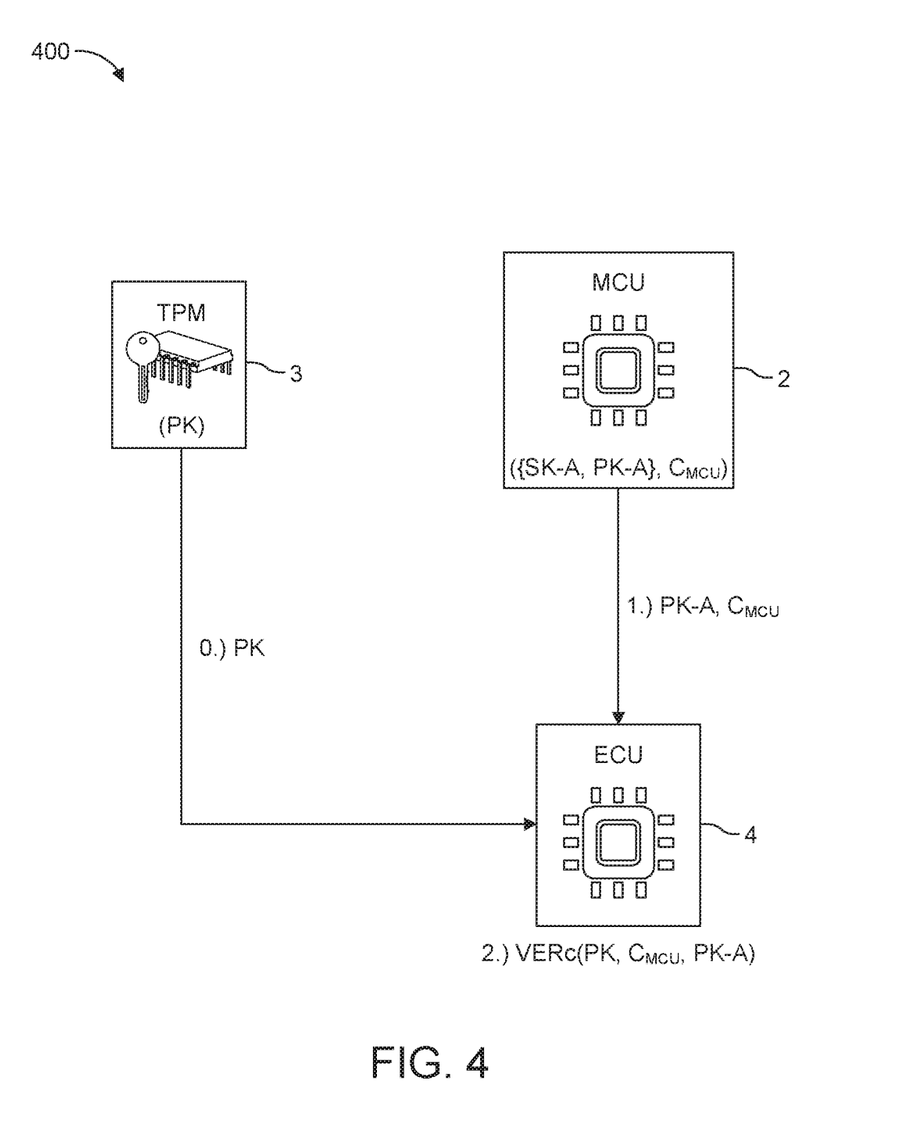
FIG. 4 is a block diagram of a trusted authentication system 400 for an automotive microcontroller according to one or more embodiments.

FIG. 4 is a block diagram of a trusted authentication system 400 for an automotive microcontroller according to one or more embodiments. The trusted authentication system 400 includes an automotive microcontroller (MCU) 2 having the hardware identifier ID-A, a TPM 3, and an ECU 4. The MCU 2 and the TPM 3 have already performed the exchange illustrated in FIG. 2. Thus, the TPM 3 stores the public key PK and the MCU 2 stores ID-A, a device-specific key pair $\{SK\text{-}A, PK\text{-}A\}$, a signature $S_{MCU}$, and a certificate $C_{MCU}$. The TPM 3 is considered to be "bound" to the MCU 2 utilizing functions provided by the TPM feature set, such as "sealing". In particular, the trusted authentication system 400 is similar to the trusted authentication system 300 illustrated in FIG. 3, except the certificate $C_{MCU}$ of the microcontroller's public key PK-A is used instead of the signature $S_{MCU}$ of the microcontroller's identifier ID-A.

In step zero, the ECU 4 receives the public key PK from a trusted entity, such as the TPM 3. Specifically, the TPM 3 sends public key PK upon receiving a request from the ECU 4. In step 1, the ECU 4 receives the certificate $C_{MCU}$ and the microcontroller's public key PK-A, which represents the transmitted data. Lastly, the ECU 4 performs a certificate verifying algorithm $VER_C(PK, C_{MCU}, PK\text{-}A)$ using the public key PK (i.e., a trusted public key of the sender) received from the TPM 3, certificate $C_{MCU}$, and the microcontroller's public key PK-A, and determines whether to accept or reject the authenticity of the signature/message.

For the certificate verifying algorithm, the ECU 4 uses the public key PK-A of the MCU 2 that comes with the certificate $C_{MCU}$ to check the digital signature. Additionally, the ECU 4 verifies that the certificate authority that issued the certificate is legitimate and trustworthy. To do this, the ECU 4 acquires the public key PK of the certificate authority from the TPM 3. Thus, the public key PK serves as the public key of the root certificate authority.

As a result, the ECU 4 is configured to use the certificate $C_{MCU}$ to verify the authenticity of the MCU's 2 public key PK-A. To do so, the ECU 4 uses public key PK, where the required public key PK for the certificate verifying algorithm is provided by a trusted entity, TPM 3 (i.e., an entity trusted by the ECU 4). The TPM 3 is a trusted entity of which the ECU 4 has an established root of trust with the TPM 3. The public key PK is the counterpart to the secret key SK that was used to sign the public key PK-A to generate the certificate $C_{MCU}$.

An unsuccessful verification operation indicates a failure of authentication of the public key PK-A. In the case of an authentication failure, the ECU 4 may signal an authentication error to the system and/or to a user.

In summary, the public key PK-A is signed using secret key SK to generate the certificate $C_{MCU}$ and the public key PK counterpart is provided by a tamper-resistant and certified device (i.e., TPM 3) or other trusted automotive MCU (not illustrated).

It is also noted that the public key PK may be stored on the MCU 2 at production time and then transferred to the TPM 3 and used when the vehicle is running.

This technique may be used to block one or more attack paths, including an attacker that distributes public keys while "impersonating" the MCU 2 (i.e., man-in-the-middle attack), an attacker manipulating storage of the PK-A at the MCU 2 by, for example, inserting its own keys, or an attacker that inserts malicious software into the MCU 2 and provides fake public keys.

The ECU 4 may be configured to perform the authentication verification check at each vehicle start-up, on demand by a user, or periodically at a predetermined time interval or after a predetermined number of vehicle start-ups.

Figure 5:
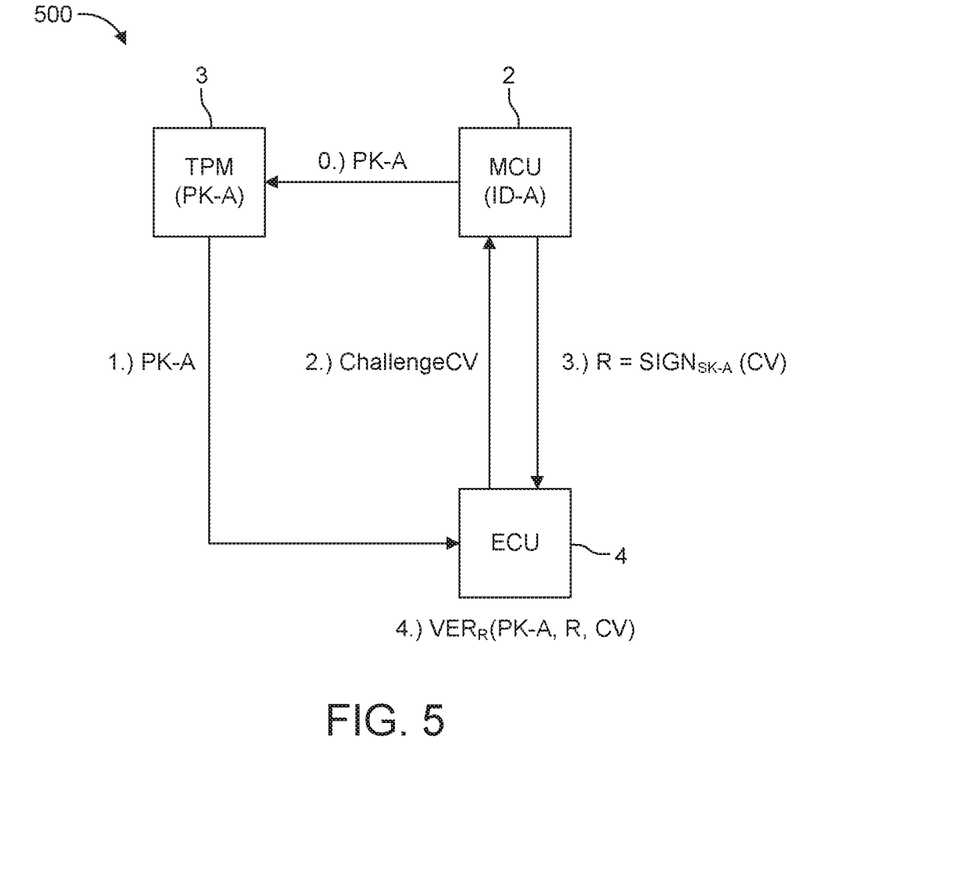
FIG. 5 is a block diagram of a trusted authentication system 500 for an automotive microcontroller according to one or more embodiments.

FIG. 5 is a block diagram of a trusted authentication system 500 for an automotive microcontroller according to one or more embodiments. The trusted authentication system 500 includes an automotive microcontroller (MCU) 2 having the hardware identifier ID-A, a TPM 3, and an ECU 4. The MCU 2 and the TPM 3 have already performed the exchange illustrated in FIG. 2. Thus, the TPM 3 stores the public key PK and the MCU 2 stores ID-A, a device-specific key pair $\{SK\text{-}A, PK\text{-}A\}$, a signature $S_{MCU}$, and a certificate $C_{MCU}$. The TPM 3 is considered to be "bound" to the MCU 2 utilizing functions provided by the TPM feature set, such as "sealing".

The trusted authentication system 500 is similar to the trusted authentication system 300 illustrated in FIG. 3, except a challenge-response authentication is used to authenticate a challenge value CV that is generated by the ECU 4 and transmitted by the ECU 4 to the MCU 2.

In particular, in step 0, the MCU 2 sends its public key PK-A to the TPM 3 which securely stores PK-A. This transfer may be securely conducted during production via a secure (e.g., encrypted) communication. In step 1, upon request from the ECU 4, the TPM 3 sends the public key PK-A to the ECU 4. In step 2, the ECU 4 generates a challenge value CV and sends a challenge to the MCU 2 that includes the challenge value CV. In step 3, in response to receiving the challenge, the MCU 2 signs the challenge value CV using its secret key SK-A, and sends the signed response R back to the ECU 4. It may also be that the MCU 2 performs step 0 in response to receiving the challenge from the ECU 4, and that the TPM 3 performs step 1 in response to receiving the public key PK-A from the MCU 2. In step 4, in response to receiving the signed response R, the ECU 4 performs a challenge-response authentication via algorithm $VER_R$ using the device-specific public key PK-A, the signature R generated using SK-A, and the challenge value CV. The signature verifying algorithm ($VER_R$) either accepts or rejects the authenticity of the challenge value CV.

As a result, the ECU 4 is configured to use the signature of the challenge value CV to verify the authenticity of the MCU 2 by verifying the authenticity of challenge value CV known to the ECU 4. To do so, the ECU 4 uses the public key PK-A, where the required public key PK-A for the signature verifying algorithm is provided by a trusted entity, TPM 3 (i.e., an entity trusted by the ECU 4). The TPM 3 is a trusted entity of which the ECU 4 has an established root of trust with the TPM 3. The public key PK-A is the counterpart to the secret key SK-A that was used to generate the signature R of the challenge value CV.

An unsuccessful verification operation indicates a failure of authentication of the MCU 2. In the case of an authentication failure, the ECU 4 may signal an authentication error to the system and/or to a user.

The ECU 4 is configured to perform the authentication schemes illustrated in FIGS. 3-5 in any combination, and may perform these authentication checks sequentially or according to predetermined conditions, such as those described above, being met. The objective of the ECU 4 is to detect unauthorized changes or tampering of an MCU. It assumes that an ECU querying the authenticity of the MCU is not compromised.

It is noted that in each of the trusted authentication systems 300, 400, and 500, the transfer of the required cryptographic data (e.g., PK-A, ID-A, etc.) under varying external circumstances, such as extreme temperature range, can be prone to errors. Since vehicles are exposed to a number of such different conditions throughout their lifecycle, it is likely that they are facing errors resulting from such circumstances. Similarly, cryptographic computations (e.g., $VER_S(PK, S, D)$, $VER_C(PK, C_A, PK-A)$, $VER_R(PK-A, R, C)$, etc.) can be disrupted, leading to errors.

This leads to a negative verification of the authenticity check even if a device corresponding to the public key is authentic.

If safety-critical real time operations (e.g., braking, steering, etc.) are affected, the execution of those operations, even in case of a negative verification, can be desired. For example, it would not be desirable for braking, steering, or some other safety-critical vehicular function to be deactivated during vehicle operation even if there is a possible error in authentication of a relevant MCU. Note, this is a difference compared to, for example, payment applications, where one negative verification would lead to a different reaction, including a rejection of transaction or blockage of a partner.

To avoid such cases, the transfer of the corresponding cryptographic data can be repeated or protected via an error-correcting code. The cryptographic computation (i.e., the authenticity validation check) can also be executed by the ECU 4 "n" total times and then based on a predefined threshold number of "m" positive verifications, the overall verification may be determined by the ECU 4 to be positive. Here, m and n are integers and m≤n.

For example, for feature activation of a particular vehicular function, the system may require m=n=1. For example, this verification test may be performed at start-up of the vehicle. In this case, the authenticity validation check is performed once (i.e., n=1) and returned a positive result once (i.e., m=1) indication the authenticity validation check was successful. As a result, the particular vehicular function is activated. On the other hand, if the authenticity validation check was unsuccessful (i.e., m=0), the particular vehicular function would not be activated until additional checks and/or analysis is performed on the relevant MCU 2 that is responsible for performing the particular vehicular function.

In another example, this time for navigation data, the system may require a majority of the authenticity validation checks to be positive, but not all, for the functionality to be approved. For example, n=3, m=2 may be sufficient to return an overall positive verification. Here, navigation data will be accepted based on "majority-voting". This verification test may be performed periodically during runtime of the vehicle. On the other hand, if the authenticity validation check is not successful a majority of times, the particular vehicular function would not be activated until additional checks and/or analysis is performed on the relevant MCU 2 that is responsible for performing the particular vehicular function In another example, this time for a braking signal, a steering signal, or some other safety-critical vehicular function, the system may allow the safety-critical vehicular function to run independently of the security check. That is, the safety-critical vehicular function remains active regardless whether an authenticity validation check is successful. For example, m=1, n=0. In this case, braking or some other safety-critical vehicular function will still be executed, but further actions can be triggered, such as additional checks and/or analysis is performed on the relevant MCU 2 that is responsible for performing the particular safety-critical vehicular function.

Thus, the ECU 4 is configured to perform one or more of the validation checks (e.g., one or more of the types of validation checks described in FIGS. 3-5) a plurality of times as a plurality of authenticity validation checks, compare a number of successful authentications from the plurality of authenticity validation checks to a predefined threshold number, determine a positive overall verification result if the number of successful authentications meets the predefined threshold number, and determine a negative overall verification result if the number of successful authentications does not meet the predefined threshold number. The ECU 4 may further determine that a functionality of the microcontroller is safe to use in response to determining the positive overall verification result, and determine that the functionality of the microcontroller is unsafe or potentially unsafe to use in response to determining the negative overall verification result. A microcontroller that is deemed unsafe or potentially unsafe may be either deactivated, not used, or flagged for further inspection by the ECU 4.

Although embodiments described herein relate to vehicle systems and automotive microcontrollers, it is to be understood that the concepts described herein may similarly be extended to any microcontroller system, including those used in industrial applications and Internet of Things (IoT), in which an established root of trust is desired.

In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, such an apparatus may execute some one or more of the method steps.

Depending on certain implementation requirements, embodiments provided herein can be implemented in hardware and/or in software. The implementation can be performed using a computer readable, digital storage medium, for example a DVD, a Blue-Ray, a CD, a RAM, a ROM, a PROM, an EPROM, an EEPROM or a FLASH memory, having electronically readable control signals stored thereon, which cooperate (or are capable of cooperating) with a programmable computer system such that the respective method is performed.

Instructions may be executed by one or more processors, such as one or more central processing units (CPU), digital signal processors (DSPs), general purpose microprocessors, application specific integrated circuits (ASICs), field programmable gate (or logic) arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. An authentication system, comprising:
  a microcontroller having a unique identifier (ID) and a first key pair including a microcontroller secret key and a microcontroller public key,
  wherein the microcontroller is configured to store the unique ID, the first key pair, a digital signature of the unique ID, the digital signature being generated using an external secret key of a second key pair, and a digital certificate of the microcontroller public key that is signed by the external secret key of the second key pair, and wherein the second key pair includes the external secret key and an external public key; and
  a controller configured to perform a first authenticity validation check on the unique ID using the external public key and perform a second authenticity validation check on the microcontroller public key using the external public key.

2. The authentication system of claim 1, further comprising:
  a tamper-resistant hardware device having a root of trust with the controller, wherein the tamper-resistant hardware device is configured to securely store the external public key and provide the external public key to the controller.

3. The authentication system of claim 1, wherein, for the first authenticity validation check, the microcontroller is configured to transmit the unique ID and the digital signature of the unique ID to the controller.

4. The authentication system of claim 3, wherein, for the first authenticity validation check, the controller is configured to apply a signature verifying algorithm using the external public key, the digital signature of the unique ID, and the unique ID, and verify an authenticity of the unique ID based on the signature verifying algorithm.

5. The authentication system of claim 1, wherein, for the second authenticity validation check, the microcontroller is configured to transmit the microcontroller public key and the digital certificate of the microcontroller public key to the controller.

6. The authentication system of claim 5, wherein, for the second authenticity validation check, the controller is configured to apply a certificate verifying algorithm using the external public key, the digital certificate of the microcontroller public key, and the microcontroller public key, and verify an authenticity of the microcontroller public key based on the certificate verifying algorithm.

7. The authentication system of claim 1, wherein:
  the controller is configured to initiate a challenge-response authentication with the microcontroller, wherein during the challenge-response authentication the controller is configured to generate a challenge value and transmit the challenge value to the microcontroller,
  in response to receiving the challenge value, the microcontroller is configured to sign the challenge value using the microcontroller secret key and transmit the signed challenge value to the controller as a challenge response, and
  in response to receiving the challenge response, the controller is configured to authenticate the microcontroller by verifying the signed challenge value with the generated challenge value.

8. The authentication system of claim 7, further comprising:
  a tamper-resistant hardware device having a root of trust with the controller, wherein the tamper-resistant hardware device is configured to securely store the microcontroller public key and provide the microcontroller public key to the controller,
  wherein the controller is configured to receive the microcontroller public key from the tamper-resistant hardware device, and verify the signed challenge value with the generated challenge value using the microcontroller public key.

9. The authentication system of claim 8, wherein the microcontroller is configured to transmit the microcontroller public key to the tamper-resistant hardware device in response to receiving the challenge value from the controller.

10. The authentication system of claim 1, wherein the microcontroller is configured to generate the first key pair.

11. The authentication system of claim 1, wherein the second key pair is generated external to the microcontroller.

12. The authentication system of claim 1, further comprising:
a tamper-resistant hardware device configured to generate the second key pair, generate the digital signature using the unique ID and the external secret key, obtain the digital certificate derived from the microcontroller public key and the external secret key, and transmit the digital signature and the digital certificate to the microcontroller.

13. The authentication system of claim 12, wherein the tamper-resistant hardware device is a Trusted Platform Module (TPM).

14. The authentication system of claim 12, wherein the tamper-resistant hardware device is a secure server.

15. The authentication system of claim 1, further comprising:
a first tamper-resistant hardware device having a root of trust with the controller, wherein the first tamper-resistant hardware device is configured to securely store the external public key and provide the external public key to the controller; and
a second tamper-resistant hardware device configured to generate the second key pair, generate the digital signature using the unique ID and the external secret key, obtain the digital certificate derived from the microcontroller public key and the external secret key, and transmit the digital signature and the digital certificate to the microcontroller.

16. The authentication system of claim 15, wherein the second tamper-resistant hardware device is configured to transmit the external public key to the first tamper-resistant hardware device.

17. The authentication system of claim 1, wherein the microcontroller is a dedicated automotive microcontroller.

18. The authentication system of claim 2, wherein the tamper-resistant hardware device is a Trusted Platform Module (TPM).

19. The authentication system of claim 1, wherein the microcontroller secret key is a use-only secret key.

20. The authentication system of claim 2, wherein the microcontroller, the controller, and the tamper-resistant hardware device are separate hardware devices.

21. The authentication system of claim 1, wherein the controller is configured to perform the first authenticity validation check a plurality of times as a plurality of first authenticity validation checks, compare a number of successful authentications from the plurality of first authenticity validation checks to a predefined threshold number, determine a positive overall verification result if the number of successful authentications meets the predefined threshold number, and determine a negative overall verification result if the number of successful authentications does not meet the predefined threshold number.

22. The authentication system of claim 21, wherein the controller is configured to determine that a functionality of the microcontroller is safe to use in response to determining the positive overall verification result, and determine that the functionality of the microcontroller is unsafe to use in response to determining the negative overall verification result.

23. The authentication system of claim 1, wherein the controller is configured to perform the second authenticity validation check a plurality of times as a plurality of second authenticity validation checks, compare a number of successful authentications from the plurality of second authenticity validation checks to a predefined threshold number, determine a positive overall verification result if the number of successful authentications meets the predefined threshold number, and determine a negative overall verification result if the number of successful authentications does not meet the predefined threshold number.

24. The authentication system of claim 23, wherein the controller is configured to determine that a functionality of the microcontroller is safe to use in response to determining the positive overall verification result, and determine that the functionality of the microcontroller is unsafe to use in response to determining the negative overall verification result.

25. A method of authenticating an aspect of a microcontroller that has a unique identifier (ID) and a first key pair including a microcontroller secret key and a microcontroller public key, wherein the microcontroller stores the unique ID, the first key pair, a digital signature of the unique ID, the digital signature being generated using an external secret key of a second key pair, and a digital certificate of the microcontroller public key that is signed by the external secret key of the second key pair, and wherein the second key pair includes the external secret key and an external public key, the method comprising:
performing, by a controller, a first authenticity validation check on the unique ID using the external public key; and
performing, by the controller, a second authenticity validation check on the microcontroller public key using the external public key.

26. The method of claim 25, further comprising:
storing, by a tamper-resistant hardware device, the external public key, wherein the tamper-resistant hardware device has a root of trust with the controller; and
transmitting the external public key from the tamper-resistant hardware device to the controller for performing at least one of the first authenticity validation check and the second authenticity validation check.

27. The method of claim 25, further comprising:
for the first authenticity validation check:
transmitting, by the microcontroller, the unique ID and the digital signature of the unique ID to the controller; and
applying, by the controller, a signature verifying algorithm using the external public key, the digital signature of the unique ID, and the unique ID; and
verifying, by the controller, an authenticity of the unique ID based on the signature verifying algorithm.

28. The method of claim 25, further comprising:
for the second authenticity validation check:
transmitting, by the microcontroller, the microcontroller's public key and the digital certificate of the microcontroller's public key to the controller;
applying, by the controller, a certificate verifying algorithm using the external public key, the digital certificate of the microcontroller public key, and the microcontroller public key; and
verifying, by the controller, an authenticity of the microcontroller public key based on the certificate verifying algorithm.

29. The method of claim 25, further comprising:
performing, by the controller, a challenge-response authentication with the microcontroller, comprising:
generating, by the controller, a challenge value;
transmitting, by the controller, the challenge value to the microcontroller;

in response to receiving the challenge value, singing, by the microcontroller, the challenge value using the microcontroller secret key;

transmitting, by the microcontroller, the signed challenge value to the controller as a challenge response; and in response to receiving the challenge response, authenticating the microcontroller, by the controller, by verifying the signed challenge value with the generated challenge value.

30. The method of claim 29, further comprising:

storing, by a tamper-resistant hardware device, the microcontroller public key, wherein the tamper-resistant hardware device has a root of trust with the controller; and transmitting, by the tamper-resistant hardware device, the microcontroller public key to the controller, wherein authenticating the microcontroller includes verifying the signed challenge value with the generated challenge value using the microcontroller public key.

31. The method of claim 30, further comprising:

transmitting, by the microcontroller, the microcontroller public key to the tamper-resistant hardware device in response to receiving the challenge value from the controller.

32. The method of claim 25, further comprising:

performing, by the controller, the first authenticity validation check a plurality of times as a plurality of first authenticity validation checks;

comparing, by the controller, a number of successful authentications from the plurality of first authenticity validation checks to a predefined threshold number;

determining, by the controller, a positive overall verification result if the number of successful authentications meets the predefined threshold number; and determining, by the controller, a negative overall verification result if the number of successful authentications does not meet the predefined threshold number.

33. The method of claim 32, further comprising:

determining, by the controller, that a functionality of the microcontroller is safe to use in response to determining the positive overall verification result; and determining, by the controller, that the functionality of the microcontroller is unsafe to use in response to determining the negative overall verification result.

34. The method of claim 25, further comprising:

performing, by the controller, the second authenticity validation check a plurality of times as a plurality of second authenticity validation checks;

comparing, by the controller, a number of successful authentications from the plurality of second authenticity validation checks to a predefined threshold number;

determining, by the controller, a positive overall verification result if the number of successful authentications meets the predefined threshold number; and determining, by the controller, a negative overall verification result if the number of successful authentications does not meet the predefined threshold number.

35. The method of claim 34, further comprising:

determining, by the controller, that a functionality of the microcontroller is safe to use in response to determining the positive overall verification result; and determining, by the controller, that the functionality of the microcontroller is unsafe to use in response to determining the negative overall verification result.

36. The method of claim 25, further comprising:

generating, by a tamper-resistant hardware device, the second key pair;

generating, by the tamper-resistant hardware device, the digital signature using the unique ID and the external secret key;

obtaining, by the tamper-resistant hardware device, the digital certificate derived from the microcontroller public key and the external secret key; and transmitting, by the tamper-resistant hardware device, the digital signature and the digital certificate to the microcontroller.

37. The method of claim 25, further comprising:

securely storing, by a first tamper-resistant hardware device, the external public key, wherein the first tamper-resistant hardware device has a root of trust with the controller;

transmitting, by the first tamper-resistant hardware device, the external public key to the controller;

generating, by a second tamper-resistant hardware device, the second key pair;

generating, by the second tamper-resistant hardware device, the digital signature using the unique ID and the external secret key;

obtaining, by the second tamper-resistant hardware device, the digital certificate derived from the microcontroller public key and the external secret key; and transmitting, by the second tamper-resistant hardware device, the digital signature and the digital certificate to the microcontroller.

38. The method of claim 37, further comprising:

transmitting, by the second tamper-resistant hardware device, the external public key to the first tamper-resistant hardware device.

* * * * *